Patented Feb. 23, 1932

1,846,221

UNITED STATES PATENT OFFICE

WILHELM MICHAEL, OF OPPAU, AND WILHELM GOEZ, OF OGGERSHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

MANUFACTURE OF HYDROCYANIC ACID

No Drawing. Application filed June 29, 1926, Serial No. 119,484, and in Germany July 6, 1925.

When formamide is catalytically decomposed at a suitable elevated temperature in order to produce hydrocyanic acid, considerable quantities of carbon monoxide and ammonia are often formed, as besides the desired reaction according to the equation $HCO.NH_2 = HCN + H_2O$ another decomposition takes place according to the equation $HCO.NH_2 = CO + NH_3$. This by-reaction is undesirable as it causes losses in formamide and the resulting gases cause trouble when the hydrocyanic acid obtained according to the first equation is worked up.

We have now found that the formation of carbon monoxide and ammonia can be reduced to such a small extent that it is of no practical importance by decomposing formamide by means of such solid dehydrating catalysts as are not capable of producing substantial amounts of hydrocyanic acid and water from carbon monoxide and ammonia. With such contact masses formamide is decomposed substantially completely to hydrocyanic acid and water and for obtaining this result it is sufficient to pass the formamide only once over the catalyst.

The catalysts to be employed in accordance with our invention are distinguished by being very apt to absorb water, whether chemically or physically. For example zeolites, whether natural or artificial (alkali metal aluminate silicates), inorganic salts such as calcium chloride, and the like can be employed. The reaction may be carried out under any desired pressure; generally it is advantageous to work under diminished pressure.

Free hydrocyanic acid can be obtained directly from the reaction mixture, for which purpose the water is preferably first removed by means of cooling fractionally. The hydrocyanic acid can also be obtained in the form of cyanides by absorbing it by bases.

The following examples will further illustrate how our present invention may be carried out in practice, but the invention is not limited to these examples.

Example 1

Formamide vapors are passed at 400° to 450° C. over commercial sodium aluminate silicate. Hydrocyanic acid is obtained in a yield of 92 per cent of the theoretical one.

Example 2

Formamide vapors are passed through a pipe heated to about 400° C. and filled with an anhydrous alkali metal carbonate, for example with soda-ash. Part of the hydrocyanic acid formed reacts with the carbonate forming sodium cyanide with a disengagement of carbon dioxide and water, while the rest of the hydrocyanic acid leaves the pipe in the free state. From time to time the pipe is filled with fresh alkali metal carbonate.

We claim:

1. The process of producing hydrocyanic acid which comprises catalytically decomposing formamide by means of a solid catalyst selected from the group consisting of zeolites and hygroscopic inorganic salts.

2. The process of producing hydrocyanic acid which comprises catalytically decomposing formamide by means of a solid catalyst selected from the group consisting of sodium aluminium silicate, calcium chloride and anhydrous alkali metal carbonates.

3. The process of producing hydrocyanic acid which comprises catalytically decomposing formamide by means of a solid catalyst selected from the group, consisting of zeolites and hygroscopic inorganic salts, the reaction being carried out under reduced pressure and at an elevated temperature suitable to effect such decomposition.

4. The process of producing hydrocyanic acid which comprises catalytically decomposing formamide by means of a solid catalyst selected from the group consisting of sodium aluminium silicate, calcium chloride and anhydrous alkali metal carbonates the reaction being carried out under reduced pressure and at an elevated temperature suitable to effect such decomposition.

5. The process of producing hydrocyanic acid which comprises contacting vapours of formamide with sodium aluminium silicate under reduced pressure and at an elevated temperature suitable to effect decomposition of the formamide.

6. The process of producing hydrocyanic acid which comprises contacting vapours of formamide at from 400° to 450° C. with sodium aluminium silicate.

7. The process of producing hydrocyanic acid which comprises contacting vapours of formamide with anhydrous sodium carbonate under reduced pressure and at an elevated temperature suitable to effect decomposition of the formamide.

8. The process of producing hydrocyanic acid which comprises passing the vapours of formamide at about 400° C. over anhydrous sodium carbonate.

9. The process of producing hydrocyanic acid which comprises catalytically decomposing formamide at a temperature of between 400° and 450° C. by means of a solid catalyst selected from the group consisting of zeolites and hygroscopic inorganic salts.

In testimony whereof we have hereunto set our hands.

WILHELM MICHAEL.
WILHELM GOEZ.